United States Patent Office 3,543,346
Patented Dec. 1, 1970

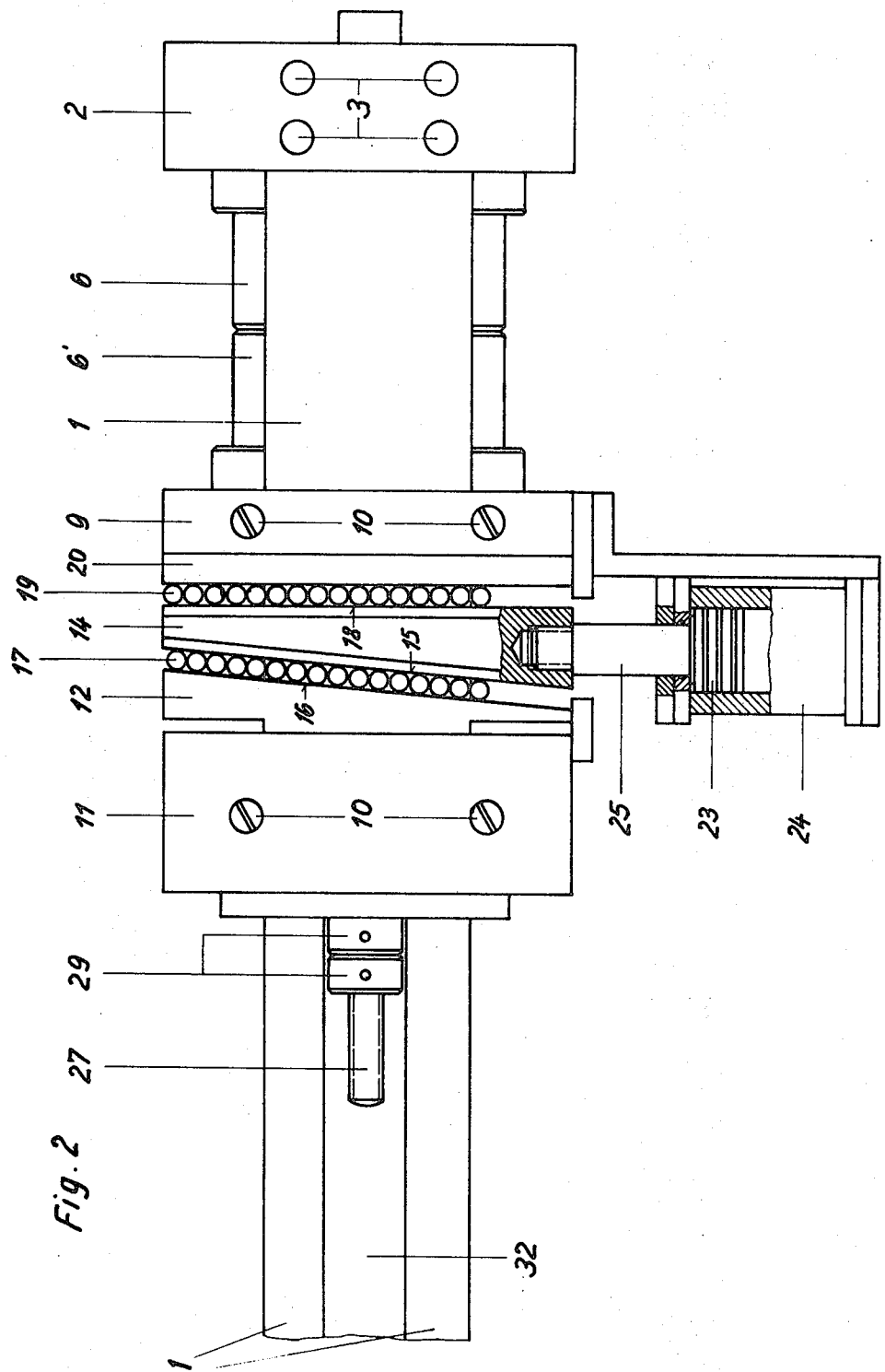

3,543,346
MOULD SUPPORT UNITS FOR INJECTION-MOULDING MACHINES
Rudolf Breher, Uffeln, uber Vlotho (Weser), Germany, assignor to Firma Elastomer AG., Chur, Switzerland
Filed July 14, 1967, Ser. No. 653,459
Int. Cl. B29f 1/06
U.S. Cl. 18—30       6 Claims

ABSTRACT OF THE DISCLOSURE

A mould support unit for an injection-moulding machine in the form of a frame with hydraulically operated closing and opening device for the mould halves mounted upon mould clamping plates, the hydraulic drive device for closing and opening the mould consisting of a first hydraulic means to effect the initial closing stroke of the mold halves and a second hydraulic means operable with a key arrangement to effect the final closing and locking stroke.

Figure 1:
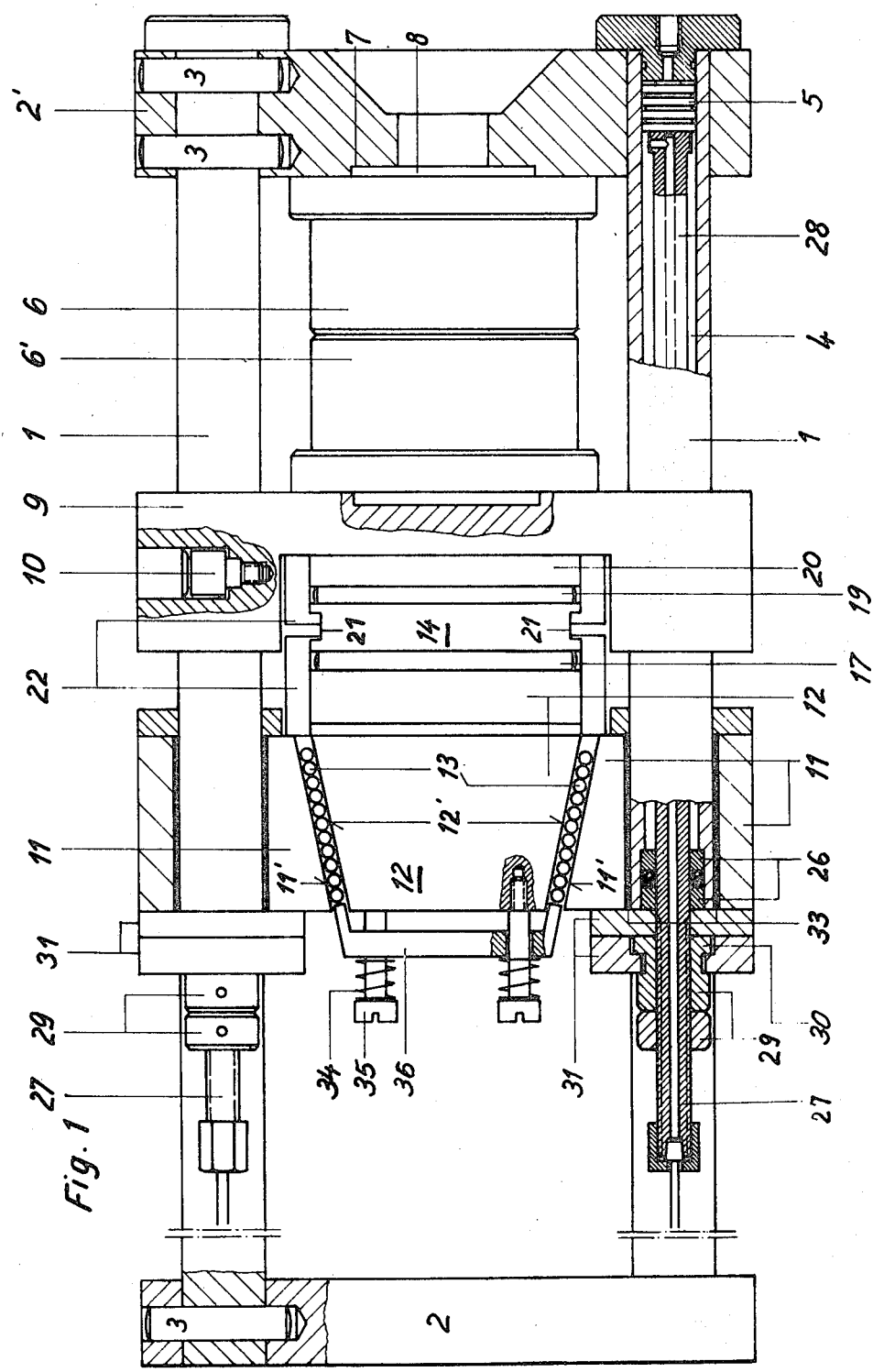

The invention relates to mould support units for injection-moulding machines, fixed to a round table or other foundation, said units being in the form of a frame with a hydraulically operated closing and opening device for the halves of the mould mounted on the mould clamping plates.

Closing and opening devices of the most varied kinds are known, ranging from purely hydraulically operated ones to those which can be locked by means of a cranked lever. These known designs have the disadvantage that they permit only relatively limited mould opening (splitting) travel. Machines having a larger mould opening travel are known but they have the further disadvantage that in order to produce the necessary closing forces, complicated projecting locking devices and loading pistons are required.

It is the aim of the present invention to overcome these drawbacks and to create a compact closing unit which takes up little space and nevertheless has a large opening travel.

The invention resides in the fact that the hydraulic drive arrangements for the mould closing and opening device are housed in the longitudinal spars or ties of the frame. In this context, the longitudinal spars or ties of the frame will preferably have a rectangular or square cross-section, bores being produced in them for the feed and recoil means, the latter generally being in the form of double-acting hydraulic pistons. This design has the advantage that as far as the accommodation of the feed and recoil means is concerned, no additional space is required so that the available longitudinal space in the frame can be exploited to the fullest extent, thus allowing maximum mould opening travel.

In a preferred embodiment of the invention, again in order to save space, one end plate of the frame is at the same time designed as a fixed mould clamping plate, whilst the other mould clamping plate is movably mounted on the longitudinal spars or ties.

To lock the mould, two so-called roller keys are preferably provided. One of these is horizontally movable and is supported on key pieces movably arranged upon the longitudinal spars or ties, whilst the other is vertically movable and is responsible for final locking, acting on one side on the first-mentioned roller key and on the other side on the movable mould clamping plate. This arrangement has the advantage that the roller-guided keys and ties require no lubrication and, furthermore, the mould clamping force is exerted through the mould halves and via the mould clamping plates and the ties, along the shortest possible path.

This invention will now be described in greater detail by way of example with reference to the accompanying drawings, in which:

FIG. 1 illustrates a plan view, partially in section, of a mould support unit with a closing and opening device in accordance with the invention; and FIG. 2 is a side elevation of the mould support unit.

On a round table or other foundation, the mould support units are fixed in the form of a substantially rectangular frame, the frame consisting of two longitudinal spars or ties 1 and two end plates 2, 2′, which make up a rigid unit. The frame components are bolted together by bolts 3. The longitudinal spars or ties 1 are of rectangular cross-section and in bores 4 contained therein, double-acting hydraulic pistons 5, which serve to close and open the mould, are housed.

The end plate 2′ forms a clamping plate for one half 6 of the mould and to this end contains a central opening 7 for the locating section 8 of the mould half 6. The other mould clamping plate 9 is movably or slidably mounted on the top edges of the longitudinal spars or ties 1, through the medium of rollers 10. The other half 6′ of the mould is attached to the plate 9.

Associated with the closing and opening device of the mould, are two key components 11, slidably mounted upon the longitudinal spars or ties 1 of the frame, these components having opposing key faces 11′ with which there co-operate a horizontally movable central key 12 whose faces 12′ are parallel with the key faces 11′, rollers 13 being inserted between the faces. The horizontally displaceable central key 12 possesses a key face 16 facing a vertically slidable locking key 14 and parallel with the key face 15 thereof, between which key faces rollers 17 are arranged. The mating surface 18 of the locking key 14 bears through rollers 19 against a thrust plate 20 attached to the movable mould clamping plate 9.

The locking key 14 is provided in its lateral faces with groove-like milled-out regions 21, in which, from either side, there engage dogs and guides 22, attached on the one hand to the horizontally movable central key 12 and on the other to the movable clamping plate 9.

The locking key 14 is operated by a double-acting hydraulic piston 23 moving in a hydraulic cylinder 24, through the piston rod 25 which is screwed to the locking key 14.

The free ends 27 of the pistons rods 28 associated with the piston 5, which ends project through the end plates 26 of the hydraulic cylinder, are each threaded to accommodate two adjusting nuts 29, one nut on each side is provided with a coupling element 30 which engages with lateral plates 31 which are attached to the key components 11. To allow for adjustment, the longitudinal spars or ties 1 are provided at least over the range of adjustment, with longitudinal slots 32.

To lock the moulds 6, 6′ the pistons 5 are urged towards the right by hydraulic pressure. Once the mould halves 6, 6′ are firmly clamped together, a limit switch initiates the application of pressure to the piston 23 in the hydraulic cylinder 24, through appropriate hydraulic control elements, the cylinder being connected to the mould clamping plate 9, and the result is an upward movement of key 14. This vertical upward motion means that the central key 12 with its rollers 13 is displaced horizontally. The key components 11 are consequently forced against the longitudinal spars or ties 1 and thus locked in position. A lining 33 of low coefficient of friction may be provided in order to reduce the pressure on the longitudinal spars 1. By means of the locking key 14, according to the degree of taper of the key face 15 and of the key components 11, the contact pressure developed can be considerably raised so that absolutely tight closing of the mould is ensured under any conditions.

The releasing of the mould is effected by pressurising the hydraulic cylinder 23 in the opposite direction. The locking key 14 is thus returned to its end position and operates the dogs and guides 22 so that the central key 12 is also returned to its end position. This releases the key components 11. The springs 34 carried on the screws 35 screwed into the central key 12, and the thrust component 36, prevent the rollers 13 from canting. The hydraulic pistons 5, controlled by limit switches, are now also pressurised in the opposite direction and the mould 6, 6' opens.

Using the adjusting nuts 29, simple adjustment of the installed height of the mould is possible, without in any way affecting the mould opening travel.

I claim:

1. A mould support unit for an injection-moulding machine, comprising mould halves, a frame with a hydraulically operated closing and opening device for the mould halves which are mounted upon mould clamping plates, the hydraulically operated closing and opening device being housed in the frame, the closing and opening device for the mould having two key components with opposed faces and said components being attached to the free ends of piston rods of the hydraulic operated opening and closing device and being slidably mounted upon longitudinal spars of the frame, said components having disposed between them a horizontally slidable central key whose faces are parallel to the faces of the key components, and rollers interposed between the central key and the two key components, so that horizontal movement of the central key being accomplished by a vertically slidable locking key so that the mould can be locked or released.

2. A mould support unit as claimed in claim 1, wherein the horizontally slidable central key having a key face which faces the vertically slidable locking key and is parallel with a key face on the latter, further has rollers being arranged between the said faces.

3. A mould support unit as claimed in claim 2, wherein the locking key has a second key face that faces the mould, said face bearing against a thrust plate on the movable mould clamping plate, by the medium of interposed rollers.

4. A mould support unit as claimed in claim 1 wherein the locking key has groove-like milled-out regions in its lateral faces, in which there engage dogs and guides, the latter being attached on the one hand to the horizontally movable central key and on the other to the movable clamping plate.

5. A mould support unit as claimed in claim 1, wherein the locking key is operated by a double-acting hydraulic piston.

6. A mould support unit as claimed in claim 1, wherein the key components are coupled to the free ends of the piston rods, the latter passing through the end plates of the hydraulic cylinder for the opening and closing device and are threaded to take adjusting nuts and coupling elements by which they are coupled to the key components.

References Cited

UNITED STATES PATENTS

| | | | |
|---|---|---|---|
| 2,115,590 | 4/1938 | Ryder | 18—30 |
| 2,482,338 | 9/1949 | Hall | 18—30 |
| 2,501,329 | 3/1950 | Hall | 18—30 |
| 2,586,896 | 2/1952 | Wittlin | 18—30 X |
| 2,691,799 | 10/1954 | Moeller | 18—30 |
| 3,093,863 | 6/1963 | Ehlert | 18—30 |

FOREIGN PATENTS 885,480  8/1953  Germany.

J. SPENCER OVERHOLSER, Primary Examiner

M. O. SUTTON, Assistant Examiner

U.S. Cl. X.R.

100—214